(12) United States Patent
LaBreche

(10) Patent No.: US 7,799,481 B2
(45) Date of Patent: Sep. 21, 2010

(54) FUEL CELL INCLUDING BYPASS CIRCUIT FOR INTERCONNECTING FUEL CELLS

(75) Inventor: Timothy LaBreche, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 866 days.

(21) Appl. No.: 11/683,666

(22) Filed: Mar. 8, 2007

(65) Prior Publication Data

US 2008/0220301 A1    Sep. 11, 2008

(51) Int. Cl.
*H01M 8/24* (2006.01)
*H01M 8/04* (2006.01)
*H01M 8/10* (2006.01)

(52) U.S. Cl. .................. 429/466; 429/428; 429/497

(58) Field of Classification Search ............. 429/30–32, 429/23, 12, 428, 466, 497
See application file for complete search history.

(56) References Cited

U.S. PATENT DOCUMENTS

| 5,298,851 | A  | * | 3/1994  | DeNardis ...................... 322/28 |
| 5,856,035 | A  | * | 1/1999  | Khandkar et al. ............. 429/32 |
| 6,296,963 | B1 | * | 10/2001 | Nanjo .......................... 429/38 |
| 6,497,974 | B2 | * | 12/2002 | Fuglevand ..................... 429/22 |
| 6,573,682 | B1 |   | 6/2003  | Pearson |
| 6,942,942 | B2 |   | 9/2005  | Haltiner, Jr. et al. |
| 7,014,929 | B2 | * | 3/2006  | Champion et al. ............. 429/13 |
| 7,087,327 | B2 |   | 8/2006  | Pearson |
| 7,247,398 | B2 | * | 7/2007  | Logan et al. .................. 429/13 |
| 2002/0031692 | A1 | | 3/2002 | Fuglevand et al. |
| 2003/0134174 | A1 | | 7/2003 | Akikusa et al. |
| 2004/0009380 | A1 | | 1/2004 | Pearson |
| 2004/0058230 | A1 | | 3/2004 | Hsu |

\* cited by examiner

*Primary Examiner*—Patrick Ryan
*Assistant Examiner*—Thomas H. Parsons
(74) *Attorney, Agent, or Firm*—Robert Svoboda

(57) ABSTRACT

In one aspect there is disclosed a solid oxide fuel cell including an insulating housing. A plurality of interconnected cells defining a stack are disposed within the housing. Each of the fuel cells includes an anode and a cathode. A bypass circuit is positioned outside of the housing and is coupled between the anode and the cathode of at least a portion of the plurality of cells allowing modification of an interconnection between the cells.

20 Claims, 4 Drawing Sheets

FUEL CELL INCLUDING BYPASS CIRCUIT FOR INTERCONNECTING FUEL CELLS

FIELD OF THE INVENTION

The invention relates to fuel cells and more particularly to fuel cells having a bypass circuit for modifying an interconnection between fuel cells.

BACKGROUND OF THE INVENTION

Fuel cells may include fuel cell stacks having many cells connected electrically in series or parallel. If one of the cells fail, it would be desirable to electrically remove the cell from the stack so that the current being produced by the fuel cell can bypass them. Removing the defective cells from the stack allows the stack to become more fault tolerant by avoiding the defective cells. There is therefore a need in the art for an improved fuel cell having the ability to remove defective cells from an array or stack of fuel cells improving the fault tolerance of the stack.

Additionally, a bypass circuit for interconnecting fuel cells may be utilized to modify the current or voltage output of the fuel cell, as well as the efficiency and desired output of the fuel cell. There is therefore, a need in the art for management of a fuel cell stack to adjust the overall power output of a fuel cell and to provide active control of individual fuel cells within the stack thereby modifying the interconnection between the plurality of fuel cells to actively control various parameters of the fuel cell.

SUMMARY OF THE INVENTION

In one aspect there is disclosed a solid oxide fuel cell including an insulating housing. A plurality of interconnected cells defining a stack are disposed within the housing. Each of the fuel cells includes an anode and a cathode. A bypass circuit is positioned outside of the housing and is coupled between the anode and the cathode of at least a portion of the plurality of cells allowing modification of an interconnection between the cells.

DETAILED DESCRIPTION OF THE PREFERRED EMBODIMENTS

Figure 1:
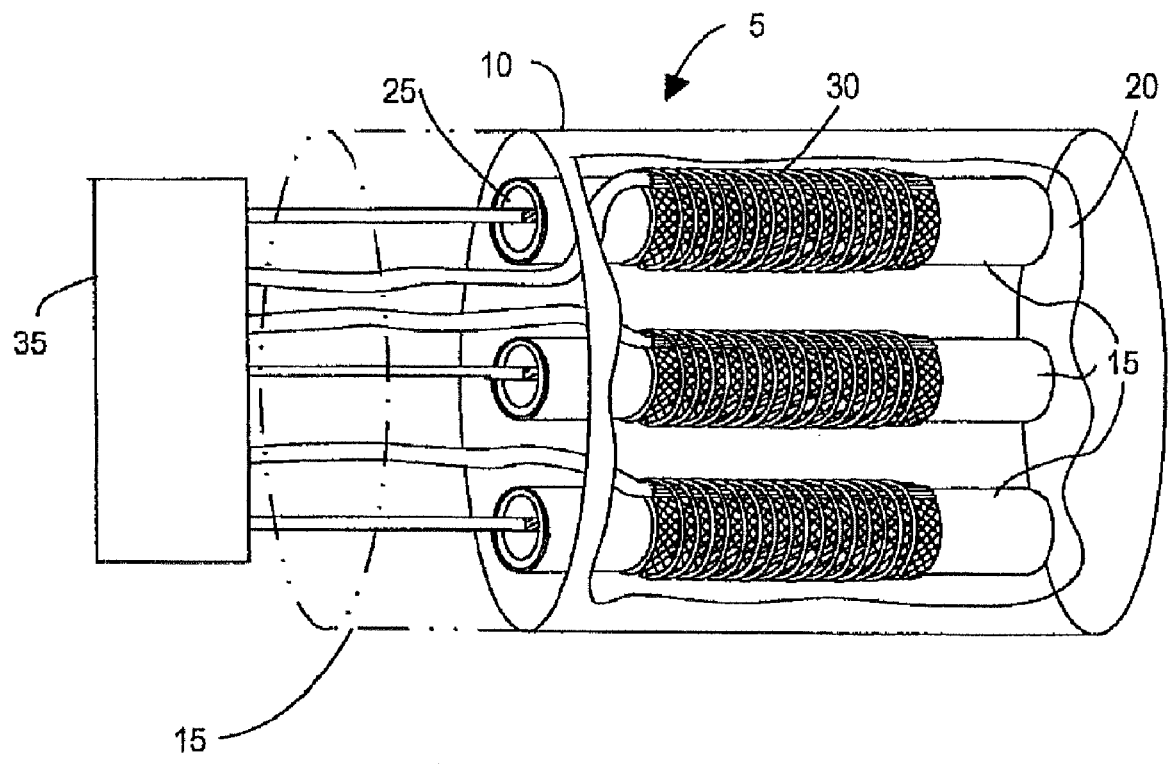
FIG. 1 is a partial perspective view of a solid oxide fuel cell including the insulating housing, a plurality of interconnected cells, and a bypass circuit positioned outside of the housing and coupled between an anode and cathode of the fuel cells.
Figure 2:
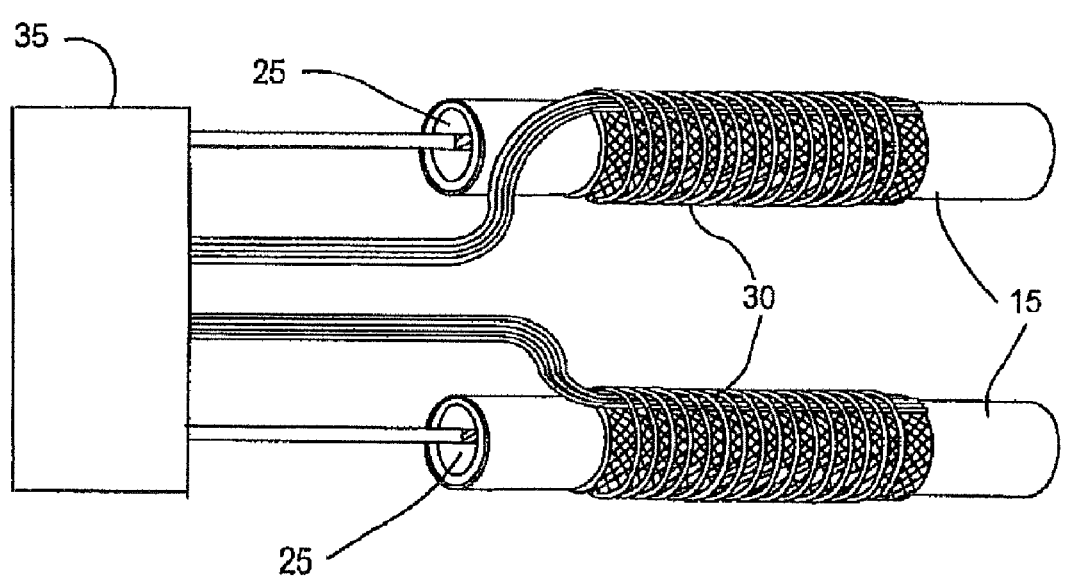
FIG. 2 is a view of two fuel cells interconnected at the anodes and cathodes and having a bypass circuit without the insulation being shown for clarity.
Figure 3:
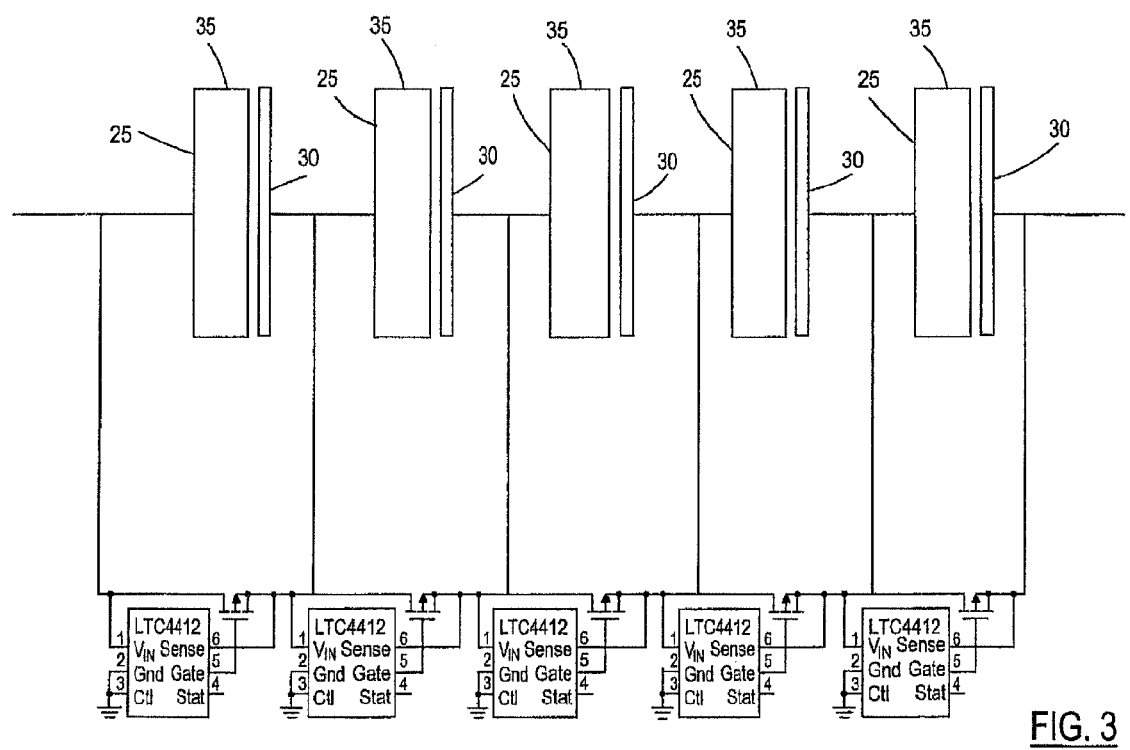
FIG. 3 is a schematic circuit diagram of a plurality of fuel cells with their anodes and cathodes and having an active diode controller.

Referring to FIG. 1, there is shown part of a solid oxide fuel cell 5 including an insulating housing 10. A plurality of interconnected cells 15 defining a stack 20 is disposed within the housing 10. Each of the fuel cells 15 includes an anode 25 and a cathode 30 separated from each other. A bypass circuit 35 is positioned outside of the housing 10 and is coupled between the anode 25 and cathode 30 of at least a portion of the plurality of cells 15 allowing modification of an interconnection between the cells 15. In one aspect, the bypass circuit 35 may be coupled between each of the plurality of cells 15 allowing modification of an interconnection between all of the plurality of cells 15. As can be seen in FIGS. 2 and 3, the bypass circuit 35 may be positioned between the anode 25 and cathode 30 of each of the plurality of cells 15 to sense the voltage between the anode 25 and cathode 30 and bypass that cell 15 if the voltage falls below a predetermined value.

In one aspect and as detailed in FIGS. 4-7, the bypass circuit 35 includes an actively controlled element 40. The actively controlled element 40 may be selected from various members including switches, gates, or other decoupling devices. Various types of switches including various transistors include NPN transistors, PNP transistors, JFET transistors, solid state switching elements, switches, field effect transistors, MOSFETs, and diodes. In another aspect, a central control unit 45 may be coupled to the actively controlled element 40 to allow for adjusting the actively controlled element 40 between various conditions.

The bypass circuit 35 may act as a passively actuated diode or may act as an actively actuated diode. Passive actuated diodes may be utilized in various conditions such as high electromagnetic environments or other situations where cost factors and other factors such as the stack heat emissions, volumetric space, temperature tolerance, shock tolerance and vibration tolerance of the various components may be modified to achieve specific results.

In another aspect, the bypass circuit 35 may act as an active diode. Various actively controlled elements 40, as listed above, may be used in the bypass circuit 35 to achieve the active diode action. In one aspect, the bypass circuit 35 includes an OR circuit. In another aspect, the bypass circuit 35 may include an OR and an AND circuit to actively manage the decoupling of various portions of the fuel cells 15 in the stack 20, as will be discussed in more detail below.

Figure 5:
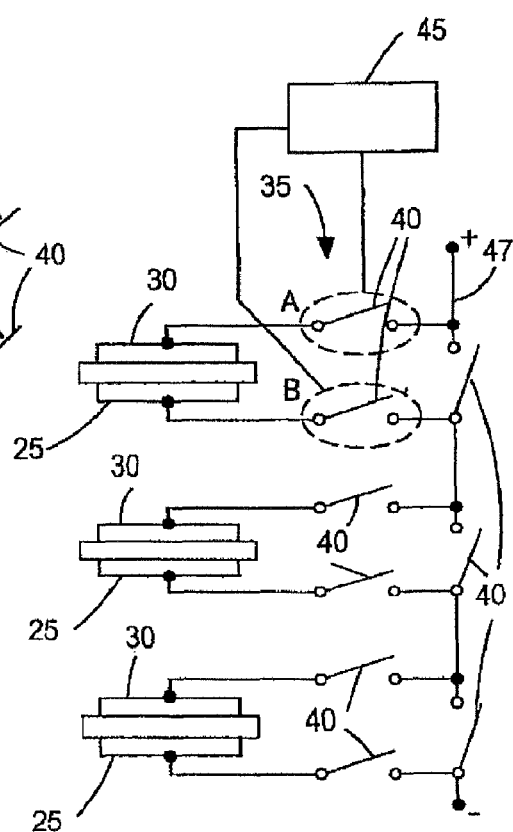
FIG. 5 is a schematic circuit diagram detailing a plurality of fuel cells depicting the decoupling of either the anode or cathode or both the anode and cathode of a fuel cell from an adjacent fuel cell.

Referring to FIG. 5 below, there is shown a schematic diagram of a plurality of fuel cells 15 having an anode 25 and cathode 30. An actively controlled element 40 is connected both at the cathode 30 and anode 25 to a buss 47. Additionally, an actively controlled element 40 is connected between the cathode 30 and anode 25 of the buss 47. As can be seen from the figure, either A or B may be decoupled from the buss 47 or A and B may be decoupled from the buss 47. Additionally, the actively controlled element 40 on the buss 47 may facilitate decoupling of the individual fuel cell 15 from the buss 47.

Figure 4:
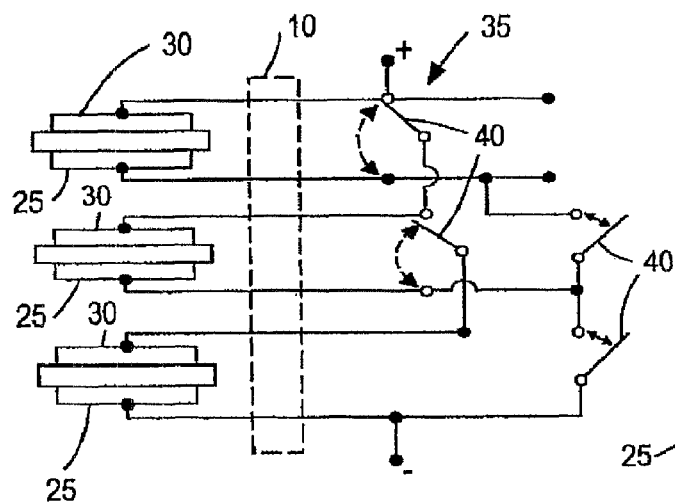
FIG. 4 is a schematic diagram of a bypass circuit having an actively controlled element allowing the plurality of fuel cells to be switched from series to parallel connections.

In another aspect of the invention, the bypass circuit 35 may include actively controlled elements 40 allowing transition from series to parallel connections between each of the plurality of fuel cells 15. As can be seen in FIG. 4, the bypass circuit 35 is positioned outside of an insulating barrier or housing 10 while the plurality of fuel cells 15 are positioned within the housing 10. Each of the fuel cells 15 includes a cathode 30 and anode 25. The cathodes 30 of adjacent fuel cells are connected via an actively controlled element 40 which may be actuated to connect with either the cathode 30 or anode 25 of the fuel cell 15. In this manner, the connection between adjacent cells 15 may be switched from series to parallel. Additionally, the anodes 25 of adjacent cells 15 are electrically coupled via an actively controlled element 40 to allow the anodes 25 of adjacent cells 15 to be connected or disconnected. Again this arrangement allows for the anodes 25 and cathodes 30 of adjacent cells 15 to be linked with either of each other to provide series or parallel connections between adjacent fuel cells 15.

As stated above, the interconnection between the cells 15 can be modified to decouple faulty cells 15 from the stack 20. Additionally, the interconnection between the cells 15 may be modified to adjust a voltage output of the stack 20. Similarly, an interconnection between the cells 15 may be modified adjusting a current output of the stack 20. Additionally, interconnection between the cells 15 may be modified managing a power output of the stack 20. Various other parameters may also be adjusted through the modification of the interconnection between the cells 15 including adjusting an efficiency of the plurality of fuel cells 15 as well as actively controlling the direct current of the stack 20. For example an efficiency of the plurality of fuel cells 15 of the stack may be modified to produce more heat rather than produce more electricity to adjust a temperature of the fuel cell such that it can be controlled to produce a desired operating condition. Additionally, the interconnection between the cells 15 may be modified managing a power output of the stack to prevent back loading of live cells 15 and improve an overall efficiency of the solid oxide fuel cell 5.

Figure 6:
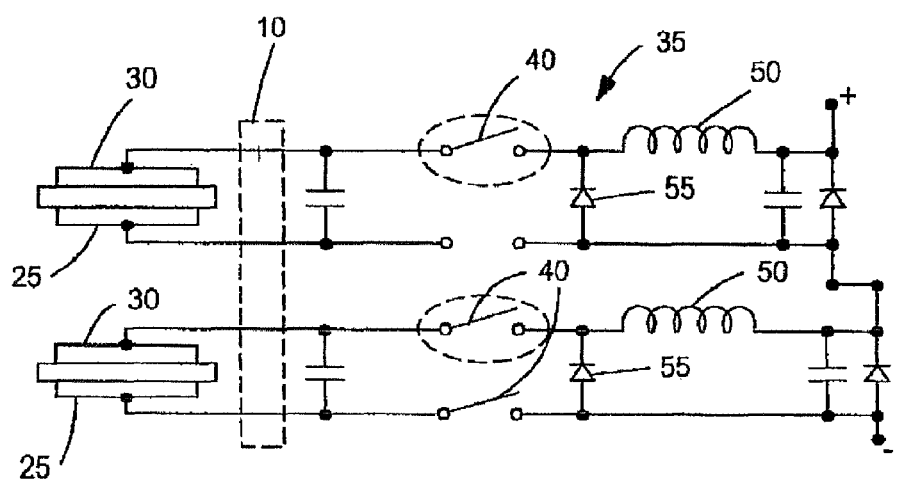
FIG. 6 is a schematic circuit diagram depicting a plurality of fuel cells including an actively controlled element allowing management of the direct current output of the fuel cell stack.

Referring to FIG. 6, there is shown a circuit diagram detailing two fuel cells 15 wherein the interconnection between the cells 15 may be modified to actively control the direct current of the stack 20. As can be seen from the figure, two fuel cells 15 are provided each having an anode 25 and cathode 30 positioned on an inside of the insulating housing 10. The bypass circuit 35 is positioned outside the housing 10 such that the heat produced from the solid oxide fuel cell does not affect the circuitry. As can be seen in the figure, the bypass circuit 35 includes an actively controlled element 40 shown as a switch as well as a converter 50 and diode 55. Such a structure allows for the active controlling of the direct current produced by the stack 20 such that the DC output of the solid oxide fuel cell 5 can be actively controlled.

As stated above, the bypass circuit 35 can be utilized to adjust the interconnection of fuel cells 15 in both a parallel or series type connection. Additionally, the fuel cells 15 may be positioned either coupled or hard wired in series or parallel. In one aspect, at least a portion of the fuel cells 15 may be connected in series or in parallel or may alternatively be connected parallel to another portion of fuel cells 15 that are connected in series. In this manner, the fuel cells 15 may be arranged in specific desired orientations to produce a desired output. The bypass circuit 35 again would allow for the decoupling of various portions of the plurality of fuel cells 15 that are interconnected to form a stack 20.

Figure 7:
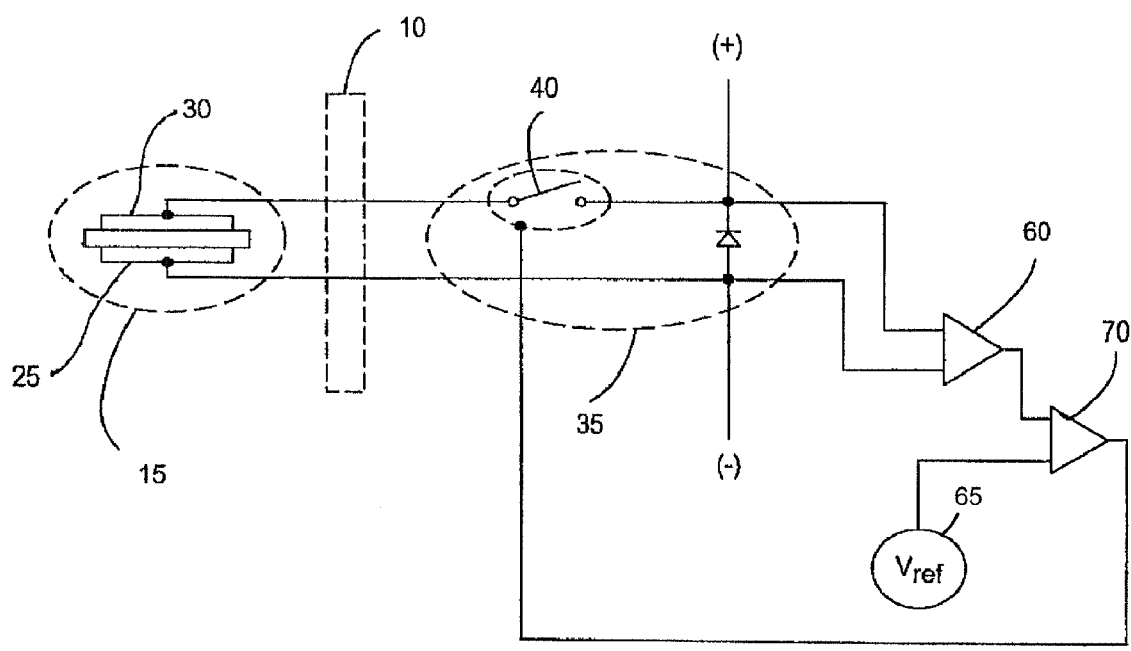
FIG. 7 is a schematic circuit diagram of an active diode element having a precision reference, a precision comparator, and a logic circuit.

In one aspect of the invention, and referring to FIG. 7, there is shown an actively controlled element 40 that includes switch. As can be seen in the figure, the switch includes a precision comparator 60, precision reference 65, and a logic driver 70. This bypass circuit 35 acts as an actively controlled diode allowing the bypass circuit 35 to be utilized to bypass various of the fuel cells 15 or to perform other functions such as described above including the adjustment of the efficiency of the cells 15, the management of the power output, current output, or voltage output of a stack 20 of interconnected fuel cells 15.

While the above description has included a general description of a solid oxide fuel cell 5 having a plurality of interconnected cells 15, in one aspect the solid oxide fuel cell 5 may be a portable solid oxide fuel cell. Additionally, the solid oxide fuel cell 5 may be handheld allowing for transportation by a person in an efficient manner. The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A tubular solid oxide fuel cell comprising:
an insulating housing;
a plurality of tubular cells defining a stack disposed within the housing, each of the tubular cells including an anode and cathode extending outside of the insulating housing; and
a bypass circuit positioned outside of the housing and coupled between the anode and cathode of each cell allowing modification of an interconnection between the tubular cells.

2. The solid oxide fuel cell of claim 1 wherein the bypass circuit is coupled between each tubular cell of the plurality.

3. The solid oxide fuel cell of claim 1 wherein the bypass circuit includes an actively controlled element.

4. The solid oxide fuel cell of claim 3 including a central control unit coupled to the actively controlled element.

5. The solid oxide fuel cell of claim 3 wherein the actively controlled element is selected from: NPN transistors, PNP transistors, JFET transistors, solid state switching elements, switches, field effect transistors, MOSFETs, diodes, and an external P-channel MOSFET.

6. The solid oxide fuel cell of claim 3 wherein the actively controlled element comprises a precision comparator, precision reference and a logic driver.

7. The solid oxide fuel cell of claim 1 wherein the bypass circuit acts as a passively actuated diode.

8. The solid oxide fuel cell of claim 1 wherein the bypass circuit acts as an active diode.

9. The solid oxide fuel cell of claim 8 wherein the bypass circuit includes an OR circuit.

10. The solid oxide fuel cell of claim 1 wherein the interconnection between the tubular cells is modified by decoupling faulty cells from the stack.

11. The solid oxide fuel cell of claim 1 wherein the interconnection between the tubular cells is modified by adjusting a voltage output of the stack.

12. The solid oxide fuel cell of claim 1 wherein the interconnection between the tubular cells is modified by adjusting a current output of the stack.

13. The solid oxide fuel cell of claim 1 wherein the interconnection between the tubular cells is modified by managing a power output of the stack.

14. The solid oxide fuel cell of claim 1 wherein the interconnection between the tubular cells is modified by adjusting an efficiency of the plurality of fuel cells of the stack.

15. The solid oxide fuel cell of claim 1 wherein the interconnection between the tubular cells is modified by actively controlling the direct current of the stack.

16. The solid oxide fuel cell of claim 1 wherein at least a portion of the tubular cells are connected in series.

17. The solid oxide fuel cell of claim 1 wherein at least a portion of the tubular cells are connected in parallel.

18. The solid oxide fuel cell of claim 1 wherein at least a portion of the tubular cells is connected in series and wherein the portion of fuel cells connected in series is connected in parallel to another portion of fuel cells connected in series.

19. The solid oxide fuel cell of claim 1 wherein the fuel cell is portable.

20. The solid oxide fuel cell of claim 1 wherein the tubular solid oxide fuel cell is handheld.

* * * * *

UNITED STATES PATENT AND TRADEMARK OFFICE
CERTIFICATE OF CORRECTION

PATENT NO. : 7,799,481 B2  
APPLICATION NO. : 11/683666  
DATED : September 21, 2010  
INVENTOR(S) : Timothy LaBreche Page 1 of 1

It is certified that error appears in the above-identified patent and that said Letters Patent is hereby corrected as shown below:

IN THE SPECIFICATION

COLUMN 1 LINE 5 INSERT

--This invention was made with government support under contract number W31P4Q-04-C-R164, awarded by the U.S. Department of Defense. The government has certain rights in this invention.--

Signed and Sealed this  
Thirteenth Day of October, 2015

Michelle K. Lee  
*Director of the United States Patent and Trademark Office*